United States Patent
Gibbs et al.

[11] Patent Number: 5,951,745
[45] Date of Patent: Sep. 14, 1999

[54] ENVIRONMENTALLY BENIGN, WASHABLE WET FILTER

[76] Inventors: Douglas P. Gibbs, 2182 Blevin Rd.; Robert A. Jensen, 2571 Blevin Rd., both of Yuba City, Calif. 95993

[21] Appl. No.: 09/084,992

[22] Filed: May 28, 1998

Related U.S. Application Data

[63] Continuation-in-part of application No. 08/864,414, May 28, 1997, abandoned.

[51] Int. Cl.$^6$ ................................... B01D 46/04
[52] U.S. Cl. ................. 96/233; 55/524; 55/DIG. 24; 95/281; 95/285
[58] Field of Search ............ 95/285, 281; 96/233; 55/DIG. 24, DIG. 13, DIG. 42, DIG. 45, 524

[56] References Cited

U.S. PATENT DOCUMENTS

| | | | |
|---|---|---|---|
| Re. 18,328 | 1/1932 | Fedeler | 95/281 |
| 1,483,379 | 2/1924 | Reed | 55/DIG. 24 |
| 1,816,836 | 8/1931 | Gagen | 95/285 |
| 2,019,241 | 10/1935 | Weiss | 55/524 |
| 2,062,090 | 11/1936 | Gaarder et al. | 55/524 |
| 2,403,261 | 7/1946 | Clark | 55/524 |
| 2,579,984 | 12/1951 | Trowbridge | 55/DIG. 24 |
| 2,770,598 | 11/1956 | Jezl | 55/DIG. 24 |
| 2,865,466 | 12/1958 | Frohmader | 55/524 |
| 2,920,718 | 1/1960 | Howell, Jr. et al. | 55/524 |
| 2,961,710 | 11/1960 | Stark | 55/DIG. 13 |
| 3,238,056 | 3/1966 | Pall et al. | 55/DIG. 13 |
| 5,437,701 | 8/1995 | Townsley | 95/285 |
| 5,525,136 | 6/1996 | Rosen | 55/DIG. 24 |
| 5,573,811 | 11/1996 | Townsley | 95/285 |

*Primary Examiner*—Duane S. Smith
*Attorney, Agent, or Firm*—Terrance L Siemens

[57] ABSTRACT

A wet filter which will not foul washing facilities and plumbing systems, and which will not introduce harmful substances into the environment. The filtering element, which mayk be a resilient, open cell foam material or a woven fabric, is coated with a mixture of oil and a tackifying agent. The oil is preferably a vegetable oil, and the tackifying agent is preferably a dimer acid. The oil and acid are mixed in a volatile carrier, such as ninety-nine percent pure isopropyl alcohol. Preferred proportions are fifty percent dimer acid and ten percent vegetable oil, by volume. The filter is saturated in the mixture. The alcohol is permitted to evaporate, thereby leaving the foam filter thinly yet fully coated with oil and acid. The filter may be washed in water and detergent for renewal. Preferably, a biodegradable detergent mixed with an alkaline substance such as soda ash is employed in washing the filter. Although the tackified oil is water resistant, the disclosed detergent enables suitable dispersal when water washing. After washing, the filter may be treated with new oil and acid mixture, allowed to dry, and reused.

6 Claims, 1 Drawing Sheet

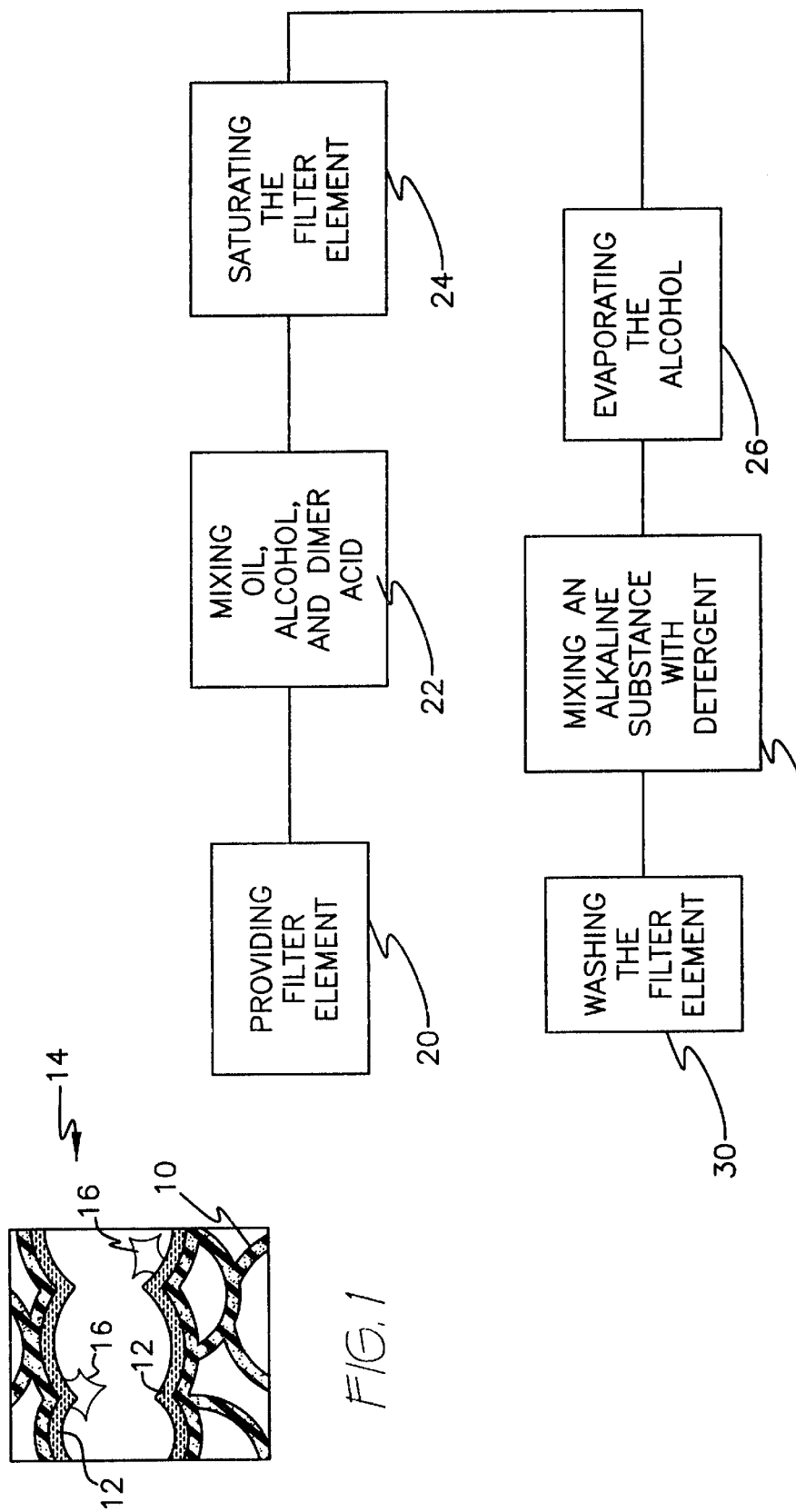

ENVIRONMENTALLY BENIGN, WASHABLE WET FILTER

REFERENCE TO RELATED APPLICATION

This application is a Continuation-In-Part of Ser. No. 08/864,414, filed May 28, 1997 now abandoned.

BACKGROUND OF THE INVENTION

1. Field of the Invention

The present invention relates generally to filters of the type having a fluid permeable filtering element which is saturated with oil to entrap airborne contaminants. More particularly, the invention sets forth a wet filter construction and related method for initially preparing the filtering element and subsequently cleaning the same in preparation for subsequent usage.

2. Description of the Prior Art

Filters for filtering air employing petroleum based oil saturated filtering elements are known in the prior art. Typical applications include small appliances employing single cylinder internal combustion engines, and off-road vehicles which are likely to encounter great volumes of airborne dust. The latter must frequently have the air filter cleaned or renewed. Filters employing reusable, oil saturated filtering elements have come into favor since preparing the filtering element for reuse is a relatively easy operation.

These filters typically employ elements comprising open cell synthetic resin foams or woven fabric materials. The filtering element is saturated with oil prior to being installed in the filter housing. Oil provides a surface which readily entraps small airborne solids. When the filtering capacity is reached, the filtering element must be cleaned, and then may be reoiled and reinstalled in the filter housing. U.S. Pat. No. 2,961,710, issued to Norman H. Stark on Nov. 29, 1960, shows a method for making an open cell synthetic resin foam filtering element.

Due to environmental concerns, traditional cleaning of a used filtering element requires modification. Conventional practice, particularly among homeowners and laymen not having professional facilities for cleaning, has been to squeeze or wring as much oil as is readily feasible from the filtering element, then to wash the filter in a solvent or with water and soap.

Washing the filter in a solvent, such as gasoline or kerosene entails health and environmental hazards. Hydrocarbons are known carcinogens, and otherwise interfere with health of the user and with the ecology if discharged directly into the ground and ground waters. Washing the filter in water with a detergent or soap creates, if not equivalent health and environmental problems, practical problems. For example, petroleum based oil resist being dissolved by water and soap, and residual undissolved oil may coat or foul domesting plumbing systems and septic tanks. Soaps and detergents may possibly leave objectionable residues in sinks and plumbing systems. Soap and detergents may not be fully effective in cleaning the filtering element, or may require undue consumption of the soap and detergent to achieve satisfactory results.

It is therefore desirable to employ an oil which is readily disposed when cleaning the filtering element. The prior art has proposed biodegradable oils to mitigate the problem of fouling and incomplete dissolution. U.S. Pat. No. 2,019,241, issued to Howard F. Weiss on Oct. 29, 1935, and 2,403,261, issued to Llewellynn J. Clark on Jul. 2, 1946, illustrate air filters impregnated with vegetable oils.

There remains a need for a method of cleaning filters impregnated with oils in a manner enabling ready and complete cleaning of the filters, and assuring minimal fouling of waste disposal facilities.

None of the above inventions and patents, taken either singly or in combination, is seen to describe the instant invention as claimed.

SUMMARY OF THE INVENTION

The present invention sets forth a preparation suitable for coating a wet filter such that the filter can be cleaned and renewed in a manner assuring effective cleansing. Equally important, waste products are not environmentally objectionable and do not foul waste disposal facilities such as sinks and plumbing systems. An open cell foam or woven fabric filter is impregnated with a biodegradable plant oil combined with a tackifying substance of great viscosity. The tackified oil is mixed with a volatile liquid carrier to assure that the mixture thoroughly permeates the filter and thoroughly coats pore surfaces of the filter. The carrier evaporates, leaving the foam filter coated with a thin coat of oil considerably tackier than pure oils which would themselves alone be sufficiently fluid to coat all pore surfaces with a thin layer without carriers. This coating of oil is resistant to water, and will remain tacky until cleaned with detergent.

The filter may be cleaned by hand or machine in water with detergent. The detergent is preferably treated with a basic substance such as soda ash, metasilicates, monoethanolamine, or the like. Using a preferred detergent, tackified oil will readily disperse in water. Effluent from the washing process contains readily biodegradable materials which will not foul washing and plumbing facilities.

The substances selected for initially coating the filter and cleaning the same are not harsh chemicals presenting obvious irritating or corrosive effects.

Accordingly, it is one object of the invention to provide a method of preparing and washing a reusable filtering element which results in waste products which readily degrade.

It is another object of the invention to facilitate hand washing of reusable filtering elements.

It is a further object of the invention to assure maximal coating of the pores of an open cell type, synthetic resin expanded foam filtering element with a tacky substance.

Still another object of the invention is to eliminate exposure to hazardous substances when hand washing filter elements.

An additional object of the invention is to prevent petroleum based oil fouling of washing facilities and plumbing systems when cleaning filter elements.

It is again an object of the invention to minimize contamination of ground and ground waters from washing of filters.

It is an object of the invention to provide a method for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a cross sectional view of a filtering element prepared according to the present invention.

FIG. 2 is a block diagram showing steps summarizing a method of practicing the invention.

DETAILED DESCRIPTION OF THE PREFERRED EMBODIMENTS

FIG. 1 illustrates a section of a filtering element (not shown in its entirety) prepared according to the present invention. The filtering element comprises an open cell synthetic or natural, preferably resilient foam material 10 coated with a viscous, tacky liquid coating 12. Material 10 has pores formed therein, one pore 14 being shown in FIG. 1. Pore 14 passes entirely through the filtering element, providing a labyrinthine flow path for air. Particles of dirt 16 become entrapped in the surface of coating 12. Of course, material 10 may alternatively comprise a woven fabric (not shown) of characteristics suitable for the purposes of an oil saturated filter. These characteristics include porousness or other structure assuring permeability of gasses and liquids.

The scheme described above is termed a wet filter. The present invention improves upon known wet filters by providing a coating 12 which is readily washed away with water and detergent when the filter element is cleaned for a subsequent use. The present invention may employ any suitable known foam material 10 or an equivalent woven fabric material, but improves upon conventional wetting agents, which typically include petroleum based oils.

Coating 12 is prepared in the following way, with steps of the method described herein being summarized in FIG. 2. A biodegradable oil, such as a raw plant oil pressed from the seed of the plant is selected. Ordinary vegetable oils, such as corn oil, safflower oil, soybean oil, peanut oil, and others will serve adequately. A dimer acid is added to the vegetable oil. Dimer acids include 9- and 10-carboxystearic acids and C-21 dicarboxylic acids. These are typically prepared from unsaturated fatty acids such as tall oil fatty acids, oleic acid, elaidic acid, and linoleic acid, which are polymerized to form dimers using a clay catalyst, followed by separation of these diners. For the purposes of the present invention, a dimer acid preferably includes pendant carboxylic acid moieties and most preferably is a polycarboxylic acid dimer of medium to long carbon fatty acids. Suitable examples of the dimer acid are obtainable from Henkel Corporation, Chemicals Group, 4900 Este Avenue, Cincinnati, Ohio 45232. These examples include products commercially available as Empol 1016 Dimer Acid, Empol 1019 Dimer Acid, and Empol 1022 Dimer Acid, prepared from oleic acid. These products are highly viscous, biodegradable derivatives of carboxylic acid which greatly enhance tackiness of the oil. Hence, the diner acid or other chemicals of similar characteristics will be termed "tackifiers", and the process of improving tackiness will be termed "tackifying".

The selected oil or oils and acid or acids are preferably mixed in a volatile liquid carrier, such as ninety-nine percent pure isopropyl alcohol. Preparation of a filter suitable for entrapping contaminant particles 16 (see FIG. 1) by adhesion of coat 12 proceeds as follows. A suitable porous filtering element is provided, this step being shown as step 20 in FIG. 2. Oil, alcohol, and dimer acid are mixed together as described above, this being step 22. The dimer acid, vegetable oil, and alcohol are mixed in proportions of forty to sixty percent by volume dimer acid and five to fifteen percent by volume vegetable oil, the remainder being alcohol. A preferred formulation includes fifty percent by volume dimer acid, ten percent by volume safflower oil, and forty percent by volume isopropyl alcohol, the latter being of ninety-nine percent purity. The constituent materials described above are so miscible that agitation rather than extended blending will yield satisfactory homogeneity in the mixture.

In a step 24, the filtering element is saturated with vegetable oil and the added dimer acid and alcohol. Characteristics of the mixture are such that it spontaneously and evenly coats the filtering element. In a further step 26, the volatile liquid carrier, in the present example this being isopropyl alcohol, is allowed to evaporate from the filter, leaving oil and dimer acid mixed such that coat 12 thinly yet effectively coats pores 14 of the filtering element.

The filter is thus prepared for service, and may be employed until it is deemed clogged or sufficiently laden with contaminants to warrant service. Rather than replacing with a new filter, the filtering element may be washed. Coat 12 will subsequently be renewed by application of the mixture described above. Washing may be performed with ordinary tapwater in a sink, washing machine, or any other ordinary household equipment. No problems of contamination will arise from hand or machine washing the filter.

Superior dispersal of oil, tackifying substance, and contaminants will be achieved when the following cleaning agent is employed. Although ordinary detergents may be employed to wash the filtering element if the latter is prepared according to the present invention, the objects of the invention will be fulfilled and superior performance will result if the detergent is a biodegradable detergent modified according to a further aspect of the invention. A suitable detergent, an example being Windfresh Detergent (TM), a product of Huish Detergents, 3540 West 1987 South, Salt Lake City, Utah, 84125, is mixed with an alkaline substance. The detergent and alkaline substance may be poured together without blending being intentionally performed.

A preferred alkaline substance is soda ash ($Na_2CO_3$). An optimum proportion is ninety percent detergent and ten percent soda ash. The precise proportion may be varied to suit individual applications, although it is preferred that detergent be provided in a range of eighty-five to ninety-five percent, the balance being soda ash. However, other inorganic substances, such as sodium bicarbonate or other salts, and metasilicates. An organic base such as monoethanolamine may be substituted, with appropriate adjustment made regarding proportion. Mixing is summarized as step 28 of FIG. 2.

The filtering element is then washed with water and the mixture of detergent and the alkaline substance, this being indicated as step 30. The filtering element may then be prepared for a subsequent use by saturating the same in a mixture of oil, dimer acid, and alcohol, and allowed to dry. The same filtering element may be indefinitely reused until the open cell foam or the woven fabric begins to deteriorate.

It is to be understood that the present invention is not limited to the embodiments described above, but encompasses any and all embodiments within the scope of the following claims.

We claim:

1. A wet filter which is washable in water and detergent, whereby washing and plumbing facilities avoid fouling by oil when said wet filter is washed by hand, for entrapping contaminant particles by adhesion, said filter having an open cell foam material and a coating disposed upon said open cell foam material, said coating comprising a vegetable oil and a dimer acid tackifying substance.

2. The wet filter according to claim 1, wherein said dimer acid is a dimer carboxylic acid.

3. The wet filter according to claim 2, wherein said coating comprises forty to sixty percent by volume of dimer acid and five to fifteen percent by volume vegetable oil.

4. A wet filter which is washable in water and detergent, whereby washing and plumbing facilities avoid fouling by oil when said wet filter is washed by hand, for entrapping contaminant particles by adhesion, said wet filter having a porous woven fabric filter element and a coating disposed on said filter element, said coating comprising a vegetable oil and a dimer acid tackifying substance.

5. The washable wet filter according to claim 4, wherein said dimer acid is a dimer carboxylic acid.

6. The washable wet filter according to claim 5, wherein said coating comprises forty to sixty percent by volume of dimer acid and five to fifteen percent by volume vegetable oil.

* * * * *